Figure 1:
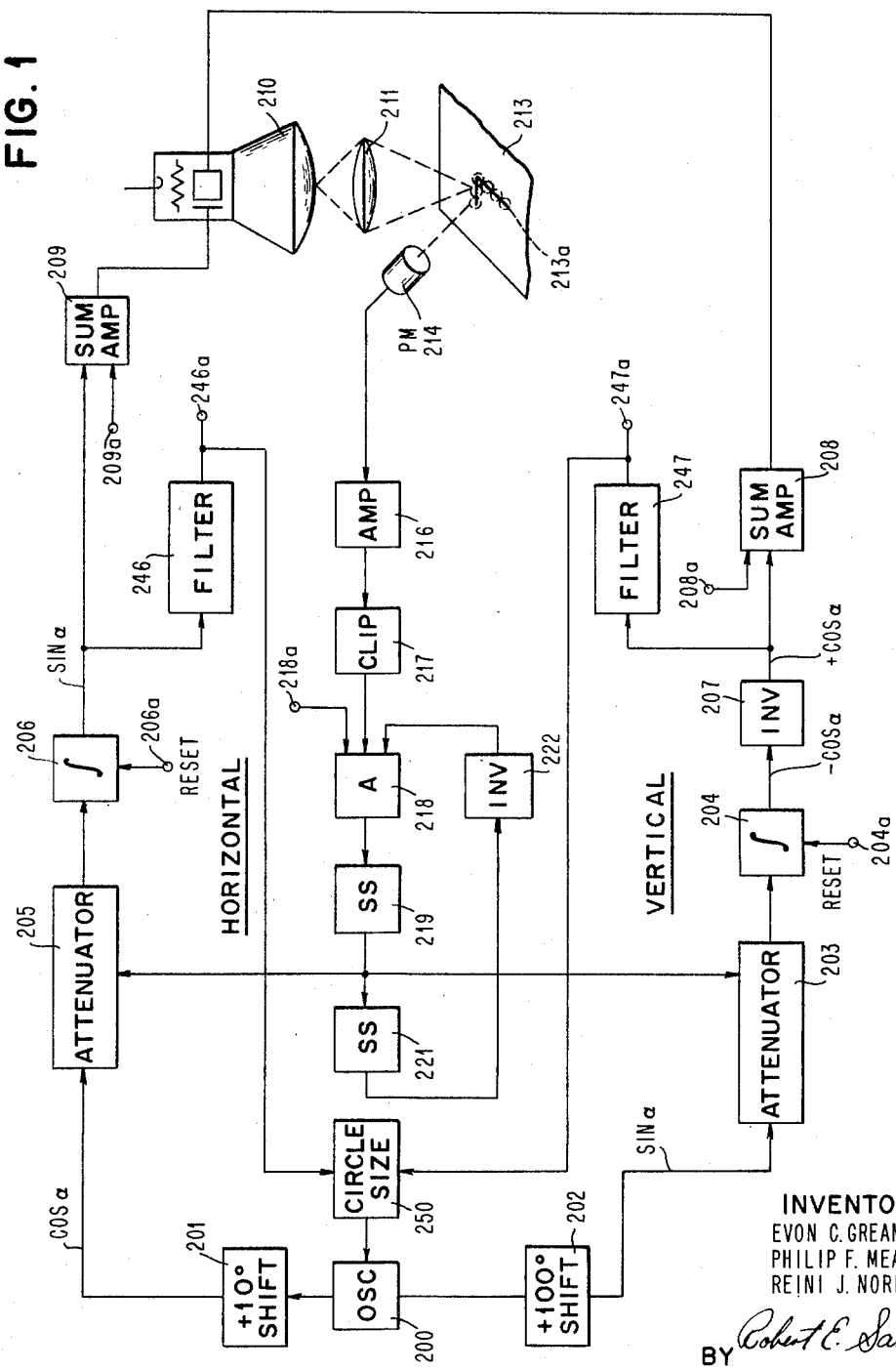

Aug. 16, 1966  E. C. GREANIAS ET AL  3,267,285
VARIABLE RESOLUTION CURVE FOLLOWING APPARATUS
Filed Aug. 29, 1963  2 Sheets-Sheet 2

FIG. 2

United States Patent Office 3,267,285
Patented August 16, 1966

3,267,285
VARIABLE RESOLUTION CURVE FOLLOWING APPARATUS
Evon C. Greanias, Chappaqua, and Reini J. Norman and Philip F. Meagher, Mount Kisco, N.Y., assignors to International Business Machines Corporation, New York, N.Y., a corporation of New York
Filed Aug. 29, 1963, Ser. No. 305,254
5 Claims. (Cl. 250—202)

This invention relates to curve following apparatus, and more particularly to improvements therein for automatically adjusting the resolution of the scanning pattern as a function of the measured parameters of the curve being followed.

Shape or pattern recognition apparatus, in order to identify conventionally printed shapes, must all employ some form of optical scanning device to reduce the printed pattern into a response suitable for processing by the recognition logic. One such form of scanning apparatus is the curve follower. In this apparatus, the shape to be identified is illuminated by a finely focused animated spot of light, and the impingement of the spot on the non-reflecting printed shape and on the reflecting background detected by a photosensitive device to produce signals to control the animation of the spot of light to follow the configuration of the shape, or curve, to be identified. As the apparatus follows the configuration of the shape, it produces signals which vary with time to manifest the path of the tracing beam. These latter signals are then processed in the recognition portion of the over-all machine to produce the requisite identification.

Necessarily, as in any servo system, the animated spot of light must hunt about the outline of the shape to be followed. In the preferred form of apparatus, in which the present invention finds its greatest utility, the spot is animated in a series of overlapping circles, and the impingement of the beam on the outline of the shape employed to control the gross migration of the beam. Since a very large circular animation pattern could bridge detailed features of any given shape, it would be desirable on one hand to impart a very small circular animation to the beam so as to insure that no details of the shape be missed. On the other hand, a very small circle slows the scanning operation, and results in a different total scan time for each different sized shape which is being scanned. For very large and crudely formed shapes, not only would time be wasted in scanning the shape with a small circle, but also, the fine resolution is unnecessary. Therefore, to obviate the foregoing difficulties the present invention performs a first, or measuring operation scan around the shape and stores at least one dimension which is manifestive of the size of shape. During the second and subsequent scans in which the recognition operation is performed, this dimension storage is employed to adjust the diameter of the scanning circle as a function of the magnitude of the stored dimension.

It is, therefore, an object of this invention to provide in a curve following apparatus means for adjusting the resolution of the scanning pattern as a function of the measurement of at least one dimensional parameter of the curve to be followed.

A further object is to provide in a curve following apparatus means for performing a first scan of the curve to be followed to determine the magnitude of at least one dimension thereof, and means operative during a second scan to adjust the resolution of the scanning pattern as a function of the magnitude of the dimension measured during the first scan.

Yet another object of the invention is to provide in an optical scanning apparatus for scanning printed characters and producing signals manifestive of the configuration of the character being scanned, means for performing a first scan of the character and storing a manifestation of the magnitude of at least one dimension of the character, and means operative responsive to the stored manifestation for adjusting the resolution of the scanning pattern on scans subsequent to said first scan.

Still another object of the invention is to provide in an electronic curve following apparatus of the type which employs a circular scanning pattern oscillating about the curve to be followed, means for measuring at least one dimension of the curve being followed and adjusting the diameter of the circular scanning pattern as a function of the magnitude of that dimension.

The foregoing and other objects, features and advantages of the invention will be apparent from the following more particular descritpion of a preferred embodiment of the invention, as illustrated in the accompanying drawings.

Figure 2:
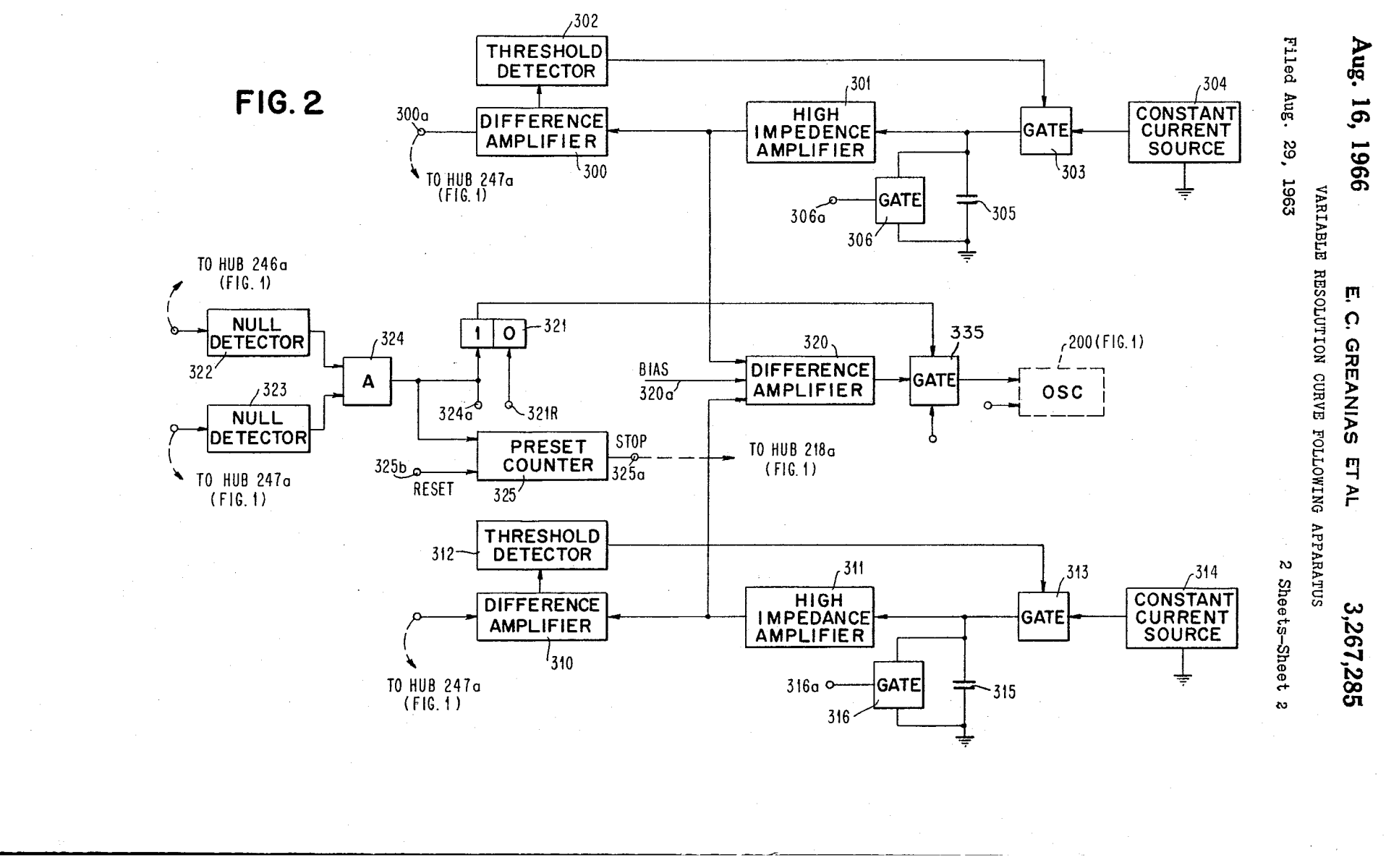

In the drawings:
FIG. 1 is a functional block diagram of an electronic curve follower.
FIG. 2 is a functional block diagram of the element labeled "circle size" in FIG. 1.

The circle size control generally identified by the reference character 250 in FIG. 1 functions to adjust the amplitude of the oscillator 200 as a function of the character size measured in a first pass around the character. From the description of the curve follower to follow, it will be explained that time variant X and Y voltages representing the displacement of the cathode ray tube beam appear at the hubs 246a and 247a, as the beam traces around the character in the manner to be described. These voltages are processed in the circle size control 250, first, to determine that the tracing beam has completed a circuit around the character, and second, to measure the size of the character by these voltages, and adjust the amplitude of the scanning circle proportionate to the measured size for the second and subsequent scans. Thus, a large character will be scanned with a coarser resolution than will a smaller character, and all characters will be scanned in approximately the same time.

The apparatus for following the outline of a character imprinted in opaque ink on a contrasting paper, which apparatus is known as a curve follower apparatus is shown in FIG. 1. The cathode ray tube 210 produces a controlled illuminated spot on the face of the tube, which spot is imaged through the lens 211 on the surface of the document 213 containing the characters to be followed and identified. One such character is shown and identified as 213a. The document 213 is contained in a light tight chamber and receives illumination solely from the cathode ray tube imaged spot. Thus, light reflected from the document 213 into the photomultiplier tube 214 will decrease and increase in intensity as the imaged spot passes into and out of the character. This difference in light intensity is amplified in the amplifier 216, the output from which controls the clipper 217 to yield a constant amplitude output response only upon a change in the reflected light from light to dark. This change necessarily connotes that the imaged spot has passed from a white background area into the black of a character, and will be hereafter referred to as a bit.

The position of the beam on the face of the cathode ray tube 210 is controlled by conventional deflection plates, or a magnetic yoke, from the voltages generated by the summing amplifiers 208 and 209. These amplifiers have search potentials applied to the terminals 208a and 209a by means, not shown, to initially position the tracing beam in close proximity to the character so as to enable the curve following to proceed. These search potentials might, for example, be generated by a pair of sawtooth waveform generators, whose phased outputs will produce a raster scan. Alternatively, the potentials could be supplied by manually controlled potentiometers to position the beam. As the search operation forms no part of this invention, the summing amplifiers 208 and 209 are added solely for the purpose of teaching where and how the search potentials could be introduced. In the curve following operation, the voltages applied to the terminals 208a and 209a are assumed to be fixed, and therefore, the amplifiers 208 and 209 act merely as conventional power amplifiers.

The animation of the cathode ray tube beam originates in the variable amplitude oscillator 200 which produces a sinusoidal output waveform of substantially constant frequency, and an amplitude controlled by the magnitude of a control voltage produced by the circle size control 250. This sinusoidal output is phase shifted 10° positively in the phase shifter 201 and 100° positively in the phase sifter 202. The output waveforms from the phase shifters, therefore, differ by 90° in phase, and, therefore, define sine and cosine waveforms. Arbitrarily, therefore, the output from phase shifter 202 shall be referred to as the sine and that from the phase shifter 201 as the cosine. The two phase shifts with the difference of 90° are employed to obviate the difficulty of achieving an accurate 90° phase shift in a single shift.

The respective sine and cosine waveforms from the attenuators 202 and 201 normally pass through the attenuators 203 and 205 without any change in their amplitude. It is only when these attenuators receive a control potential from single shot 219 that they will attenuate the signals entered therein. The sine and cosine waveforms respectively are integrated in integrators 204 and 206 to yield waveforms respectively of $-\cos \alpha$ and $+\sin \alpha$, as is well known in integral calculus. Because it is desired that the beam rotate counterclockwise, the $-\cos \alpha$ waveform is inverted by the inverter 207 to yield $+\cos a$. With $+\cos \alpha$ entered in the summing amplifier 208 and $+\sin a$ into amplifier 209, the cathode ray tube 210 will produce a circular beam trace, the diameter of which is proportional to the amplitude of the basic waveform.

Since the tracing beam has been initially positioned adjacent to the character 213a, the circular beam trace will at some point in its rotation intercept the black of the character. The photo-multiplier 214 response, amplified in amplifier 216 will activate clipper 217 to yield an output pulse, passed by AND gate 218 to fire the single shot 219. The single shot 219 has the characteristic that, once it is energized by an enabling pulse, it will produce an output pulse of fixed duration and amplitude, independent of the firing pulse. The single shot 219 is so constructed that its output pulse continues for 180° of beam time. For the duration of the pulse output from the single shot 219, the potential, thus derived, causes the attenuators 203 and 205 to attenuate the respective waveforms entered therein. These attenuators are in effect, adjustable gain amplifiers whose gains are set at two different levels by the presence or absence of the potential set by the pulse output from the single shot 219. The attenuators 203 and 205, when they are activated by single shot 219, produce a small semicircle scan. Upon the cessation of the pulse output from single shot 219, the attenuators return to their initial state to provide the large circular scan, until the next hit is experienced.

Normally, the small semicircular scan and the power of the lens 211 are of such magnitude that the small semicircle traces entirely within the black of a character line. However, because of imperfections in print quality and line thickness, the small semicircular scan may break out of and back into a character line. As a safety measure, therefore, when the pulse from the single shot 219 ceases, its cessation fires single shot 221 whose output, through the inverter 222 removes the enabling potential from AND 218 to prevent a spurious pulse from clipper 217 from prematurely refiring single shot 219. The duration of 30° (with respect to beam time) of the pulse from single shot 221 assures that the beam will exit from the line and resume its large circular trace without danger of refiring the single shot 219.

The additional terminal 218a to AND gate 218 is normally potentialized during the curve follower action to enable the gate to pass the pulses from clipper 217. If this terminal is depotentialized, the clipper pulses will be blocked and the follower action cannot proceed, as the beam will continue to maintain its large circular trace. This terminal 218a provides an effective beam blanking, which could not be achieved by grid action on the cathode ray tube 210. Were grid control employed, the photo-multiplier tube 215 would be unable to distinguish a legitimate hit from the black return occasioned by conventional blanking. By depotenialization of this terminal, the integrators will be fed Sin $\alpha$ and Cos $a$ of full amplitude continuously and will, therefore, accumulate no additional charge. The beam will, therefore, dwell with the circular dither of the large circle. The arresting action of the hub 218a is useful when the beam is to be moved from character to character to prevent premature false following attempts while the beam is passing through one character to the next.

Since the curve follower is primarily designed to yield time variant voltages for analysis by recognition circuits whose purpose it is to identify the character traced, the filters 246 and 247 are provided. These filters receive the voltages produced by the integrators 206 and 204 (through inverter 207), and are tuned to pass only the slowly varying components thereof and ground the alternating current dither signal. The outputs 246a and 247a, therefore, represent the X and Y beam displacements as a function of time, and in fact, if connected to an oscilloscope, will produce a display which is visually recognizable as the character traced. It is these time variant X and Y voltages that are analyzed to achieve the recognition.

As was stated, the resolution of the scanning circles is proportioned to the size of the character. In the circuits of FIG. 1, this adjustment is shown schematically by the box 250 which feeds the oscillator 200. Although no details are shown in FIG. 1, it is sufficient to understand that the curve follower performs a first pass around the character, during which time the maximum voltage excursions occuring at the terminal 247a are stored as $+V_y$ max. and $-V_y$ max. The difference of these voltages is a measure of the character height. Since large characters require less resolution, a large difference between the two maximum voltages will produce an increase in the amplitude of the output waveform from the oscillator 200, and a small difference, a lesser amplitude waveform. This amplitude adjustment of the oscillator 200 occurs at the end of the first pass around the character and is effective for all subsequent passes.

As has been just explained, the curve follower shown in FIG. 1 produces time variant voltages at the output hubs 246a and 247a of the filters 246 and 247, respectively measuring the instantaneous horizontal and vertical beam positions, while the beam is tracing the outline of curve being followed. When the beam is initially positioned adjacent to the curve whose outline is to be traced, the integrators 204 and 206 are reset to zero by discharging the capacitors, inherent in any standard integrator circuit of the type employed here, by applying reset pulses to the hubs 204a and 206a. At this time, the flip-flop 321 (FIG. 2) is also reset to the zero stability state by application of a reset pulse to the hub 321R, which reset pulse continues for a period in excess of other reset pulses, so as to allow the curve following action to proceed away from its initial position, wherein both the X and Y displacement voltages at hubs 246a and 247a are zero. This reset pulse insures that the flip-flop 321 will be properly reset, and not falsely set by the initial displacement of the beam.

Since the tracing beam may undergo both positive and negative excursions with respect to the initial point of contact where the curve following action is initiated, any measure of the maximum vertical size of the character, must measure the difference between the maximum positive and negative voltage excursions of the vertical cathode ray tube beam deflection voltages. To this end, the voltage appearing at the hub 247a (FIG. 1), which voltage is proportional to the beam deflection voltage (filtered of its circular dither), is applied to both of the difference amplifiers 300 and 310 (FIG. 2). Amplifier 300 processes positive voltage, and amplifier 310 negative voltages.

Amplifier 300 produces an amplified output of the difference between the potential on hub 300a (hub 247a) and the voltage output of the amplifier 301. So long as the potential of hub 300a is positively greater than the potential produced by amplifier 301, the threshold detector 302 produces a constant amplitude control signal to open gate 303 to pass charging current from the constant current source 304 to charge the capacitor 305, the potential charge in which is amplified by the high impedance amplifier 301 for comparison with the input voltage on hub 300a, as hereinabove explained. Thus, by this circuitry the capacitor 305 will accumulate a charge which is a measure of the maximum positive voltage excursion of the hub 300a and, therefore, measures the maximum positive excursion of the cathode ray tube tracing beam from its initial point of contact.

The maximum negative excursion of the cathode ray tube tracing beam from its initial point of contact is measured by the charge on the capacitor 315, which is charged from the constant current source 314 through control of the gate 313 by difference amplifier 310 and threshold detector 312, as explained above with respect to the positive voltage storage.

Since both amplifiers 301 and 311 present a very high impedance load to the respective capacitors 305 and 315, these capacitors will hold whatever charge they have accumulated without any appreciable loss, and their respective voltages will be available as useful outputs from the amplifiers 300 and 310, without loading the capacitors. The outputs from the amplifiers 301 and 311 are applied to a difference amplifier 320, whose potential output, by virtue of the positive bias applied to the input 320a, will vary positively in proportion to the algebraic differences of the accumulated charges in the capacitors 305 and 315.

Since it is desired to make a first or measuring pass around the curve to be traced and adjust the resolution (diameter of the circular dither pattern) only on subsequent passes, it is necessary that the charge accumulation in the capacitors be effected during the first pass, and utilized in subsequent passes. Therefore, as the curve following operation is first initiated by applying initial positioning voltages to the hubs 209a and 208a (FIG. 1), an enabling potential to the hub 218a (FIG. 1) to enable the black "hit" pulses to produce the curve following action, a reset pulse is applied to the hubs 306a and 316a to close shorting gates 306 and 316 to discharge capacitors 305 and 315 of any potentials accumulated in prior operations. The reset pulse applied to the hub 321R resets flip-flop 321, and continues long enough to insure that the tracing beam moves away from its initial zero-zero position.

As the tracing beam traces the curve on the first pass, the capacitors 305 and 315 will accumulate charges to measure the character size. When the tracing beam returns to its starting position, the integrators 204 and 206 (FIG. 1) will both return to zero. This zero voltage will appear at the hubs 246a and 247a (FIG. 1) and at the inputs to the null detectors 322 and 323 (FIG. 2) connected thereto. At this time the null detectors 322 and 323 will both produce an output which are "ANDed" in the "AND" gate 324 to signal that the first pass around the curve has been completed. This completion of pass signal from AND gate 324 sets the previously reset flip-flop 321 to produce a control potential from the set or "1" side of the flip-flop 321 to open gate 335, and permit the voltage from the difference amplifier 320 to pass to the oscillator 200 (FIG. 1) to adjust the amplitude of its sinusoidal waveform proportionally to the size of the character.

The oscillator 200 will continue to produce waveforms having an amplitude proportional to the character size for as many subsequent passes around the character, inside the character or in any other type of scan which the curve follower may be specially ordered to produce. Every time the tracing beam returns to its start position the AND gate 324 will produce a completion signal at the hub 324a, which signal may be employed to stop the scanning at the end of the second or any subsequent pass by negatively stepping a counter 325, preset to any desired number until the counter reaches zero and produces a stop potential on the hub 325a. This stop pulse may be connected to depotentialize the AND gate 318 (FIG. 1) and stop the follower action as above described. This completion signal, however, once it sets the flip-flop 321, cannot subsequently alter its status. It is only when the flip-flop is reset at the start of a first scan that it can achieve the reset state. Thus, after the first pass, the oscillator is controlled by the magnitude of the algebraic differences of the voltages stored in capacitors 305 and 315 as a measure of the maximum character height. This control continues until the system is reset.

It might be noted in passing that the capacitors 305 and 315 are connected to accumulate charge not only in the first pass around the curve being traced, but also in all subsequent passes. Since the same character is being traced, its size remains fixed. The capacitors will, therefore, not accumulate any greater charges in subsequent passes than those they accumulated in the first pass. Should, there be any tendency to lose charge from the capacitors 305 and 315, this loss will be replaced during the subsequent passes.

While the current sources 304 and 314 have been characterized as constant current sources, the degree of regulation required for the purpose of this circuit is not critical. It is only required that the current output be substantially independent of the voltage charge on the capacitors connected thereto. By this relationship, the rate of change of the voltage charge on the capacitors will, therefore, be substantially constant. So long as the maximum vertical gross migration velocity of the electron tracing beam does not exceed the rate of change of the voltage charge on the capacitors, the charge will accurately reflect the maximum beam excursion. Since the maximum vertical migration velocity of the beam can be accurately predicted, the current sources 304 and 314 are so chosen that their current output never falls below that value required to charge the capacitors 305 and 315 at a rate equal to the maximum rate of change of the vertical deflection voltage (filtered of the circular dither component).

While it has been shown how the character size adjusts the basic circle size of the tracing beam by controlling the amplitude of the oscillator 200, it is further possible to adjust the amplitude for any purpose at any time during the scan. For example, one might wish to increase the resolution in the area of the tail on a capital "Q" or in the area of the re-entrant angles at the sides of the figure "8," so as to distinguish it from the figure "0." To this end, a control potential applied to the hub 325a of gate 325 will close the gate, thus removing the potential output from tht difference amplifier 320 from the oscillator 200, simultaneously with the application of a potential applied to hub 330 to provide the desired amplitude of oscillation and circle size.

The invention herein described, in summary, permits voltages manifestive of the maximum positive and negative dimensions of any curve, measured from any arbitrary zero reference point to be accumulated and stored, during a first measuring trace of the character. The algebraic difference of the two stored voltages is then employed during subsequent traces of the curve to control the tracing resolution in accordance with the size of the character. The resolution is adjusted by controllably altering the amplitude of the oscillator that produces the basic sinusoidal waveform upon which the servo action of the curve follower depends.

While the invention has been particularly shown and described with reference to a preferred embodiment thereof, it will be understood by those skilled in the art that various changes in form and details may be made therein without departing from the spirit and scope of the invention.

What is claimed is:

1. In a servo apparatus for cyclically following the configuration of a pattern sensed by a scanning beam of radiant energy animated in a series of overlapping circles to impinge on the pattern and produce a response for controlling the following action of the servo, and having means therein for producing time variant manifestations of the displacement of the radiant energy beam,
   (a) means operative during a first cycle of operation of said servo apparatus and responsive to said time variant displacement manifestations for storing the maximum and minimum values of said manifestations;
   (b) means operative during cycles of operation of said servo apparatus subsequent to said first cycle of operation for deriving a signal proportional to the difference of said stored maximum and minimum values of said manifestations;
   (c) and means responsive to the magnitude of said signal for controllably adjusting the size of the overlapping circles,
   whereby the resolution of the scanning beam is adjusted in accordance with the size of the pattern being followed.

2. In a curve following apparatus for cyclically following the configuration of an imprinted character sensed by a scanning beam of light animated in a series of overlapping circles to impinge on the character and produce a response for controlling the following action of the servo, and having means therein for producing time variant voltage waveforms manifestive of the orthogonal displacements of the scanning beam as it follows the outline of the character;
   (a) means operative during a first cycle of operation of said servo apparatus for storing the maximum and minimum values of voltages manifesting at least one of said orthogonal dimensions;
   (b) means operative during cycles of operation subsequent to said first cycle of operation for obtaining the difference of said stored maximum and minimum voltages;
   (c) and means responsive to said difference voltage for controllably adjusting the size of the overlapping circles.

3. In a curve following apparatus operative to follow the configuration of an imprinted character in a succession of closed paths and having sinusoidal waveform generator for controlling the animation of a spot of light impinging on the character to be followed in a series of overlapping circles, and producing time variant horizontal and vertical displacement voltages manifestive of the successive orthogonal displacements of the spot of light in following the outline of the character;
   (a) means operative during a first trace of the character for charging a first capacitor with a voltage proportional to the maximum vertical displacement voltage;
   (b) means operative during said first trace for charging a second capacitor with a voltage proportional to the minimum vertical displacement voltage;
   (c) means operative during traces subsequent to said first trace for obtaining a voltage proportional to the difference of the voltage charges on said first and second capacitors;
   (d) and means responsive to the magnitude of said difference voltage for controllably altering the amplitude of said sinusoidal waveform generator.

4. In a curve following apparatus including a sinusoidal waveform generator, a cathode ray tube, a photodetector device, and horizontal and vertical integrators, operative to control the animation of the cathode ray tube beam so as to animate a spot of light in a series of overlapping circular traces impinging on an imprinted character whose configuration is to be followed, and producing time variant voltage waveforms respectively manifestive of the horizontal and vertical displacements of the cathode ray tube beam in following the outline of the character;
   (a) means operative during a first trace around said imprinted character and responsive to said voltage waveforms for storing a pair of voltages respectively proportional to the maximum and minimum values of at least one said waveforms;
   (b) means operative during a second and subsequent traces around said character for deriving a voltage proportional to the difference of said stored pair of voltages;
   (c) and means responsive to the magnitude of said difference voltage for controlling the amplitude of said sinusoidal waveform generator.

5. An improved curve following apparatus for adjustably controlling the resolution of the scanning pattern as a function of the magnitude of at least one dimension of the character comprising:
   (a) means for generating a pair of sinusoidal waveforms having the same amplitude and frequency but relatively displaced by ninety degrees;
   (b) a pair of variable attenuation devices respectively connected to receive said pair of sinusoidal waveforms;
   (c) a pair of integrators respectively connected to said pair of attenuation devices;
   (d) a cathode ray tube having horizontal and vertical deflection controls respectively connected to said pair of integrators;
   (e) means for imaging the illumined spot of said cathode ray tube upon an imprinted symbol;
   (f) a photo-responsive means operative to detect the changes in illumination as said spot illuminates said imprinted character and the background upon which the character is printed;
   (g) means responsive to said photo-responsive means for controlling the attenuation level of said variable attenuation devices, whereby said spot of light will follow the configuration of said character in a succession of overlapping circles;
   (h) a pair of filters connected one each to each of said integrators for filtering the sinusoidal components from the integrated waveform produced thereby;
   (i) means connected to one of said filters for storing the maximum voltage excursions of the filtered waveform output from the connected integrator on a first trace of said character;

(j) and means operative during a second trace of said character responsive to the difference of said stored voltages for altering the amplitude of the sinusoidal waveforms.

References Cited by the Examiner
UNITED STATES PATENTS 3,189,873   6/1965   Rabinow _____ 340—146.3

RALPH G. NILSON, *Primary Examiner.*
J. D. WALL, *Assistant Examiner.*